Dec. 21, 1926.  1,611,732

L. FEKETE

FURRIER'S KNIFE

Filed Nov. 20, 1925

Inventor
Ladislaus Fekete
By Wooster & Davis
Attorneys

Patented Dec. 21, 1926.

1,611,732

UNITED STATES PATENT OFFICE.

LADISLAUS FEKETE, OF BRIDGEPORT, CONNECTICUT.

FURRIER'S KNIFE.

Application filed November 20, 1925. Serial No. 70,293.

This invention relates to a knife, particularly a furrier's knife, and has for an object to provide a knife of this character which is extremely simple in construction and may be made almost entirely of sheet metal, so that the entire knife structure will be of a very thin nature adapted especially for furriers and similar use.

A further object of the invention is to provide an improved means for removably mounting the blade so that it may be easily and quickly removed and inserted for sharpening, renewals and the like.

With the foregoing and other objects in view, I have devised the construction illustrated in the accompanying drawing forming a part of this specification, similar reference characters being employed throughout the various figures to indicate corresponding elements. This application is a continuation in part of my prior application Serial No. 752,394, filed November 26, 1924, for furriers' knives.

In this drawing.

Figure 1:
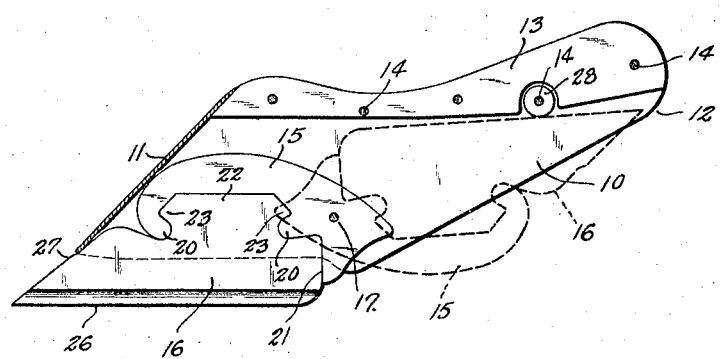
Fig. 1 is a side elevation with one of the side members of the body removed to more clearly show the construction.
Figure 3:
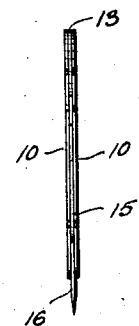
Fig. 3 is an end view looking from the right of Fig. 1.
Figure 2:
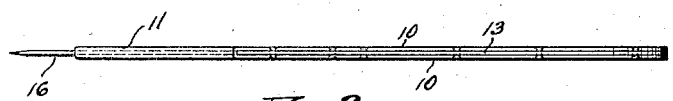
Fig. 2 is a top plan view.

The knife in the construction illustrated comprises a body member of one piece of sheet metal folded upon itself to form side members 10 connected by the wall 11, and the body member is so shaped that when folded the connecting wall 11 is inclined substantially as shown, and the opposite portions of the side members are shaped to form a convenient handle or grip 12. The side members are held in proper spaced relation by the filling member 13 in the form of a plate between the side members at the upper portion thereof, and then the members are secured together and to this filling plate by suitable means, such as rivets 14.

Pivoted between the side members is a plate 15 forming a support for the blade 16, the plate 15 being pivoted between the side members by the rivet or pin 17 which also acts to prevent the side members separating. This plate is provided with a notch or recess 18 undercut at its opposite ends as shown at 19 and preferably tapered as shown to form the securing lugs 20, and this plate also has a shoulder 21 at one side of this recess and extending at substantially right angles to the length of this recess. The blade 16 is provided with an extension 22 tapered at its opposite ends as shown at 23 to fit this recess in the plate 15 when its end 24 rests against the shoulder 21. This construction provides recesses 25 in which the lugs 20 are seated. It will be apparent that the blade may be attached to the supporting plate by inserting the extension 22 in the notch 18 by relative lateral movement of the blade with respect to this plate, and the blade may be removed from the plate by a similar movement. The blade and the plate are preferably of practically the same thickness.

Figure 4:
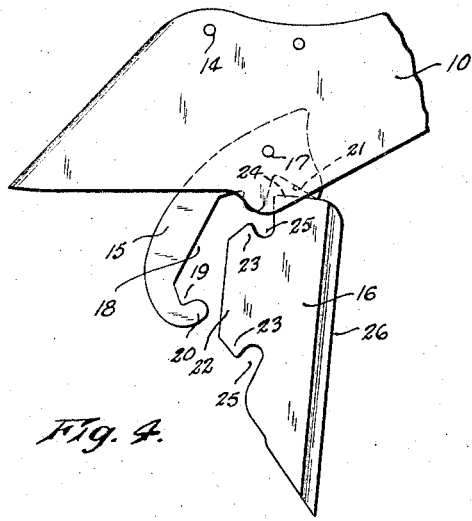
Fig. 4 is a detail side elevation showing the method of removing and applying the knife blade.
Figure 5:
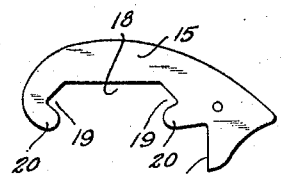
Fig. 5 is a side elevation of the blade holder.
Figure 6:
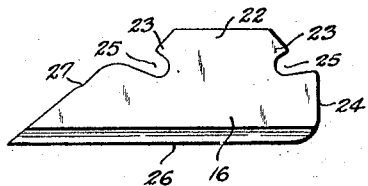
Fig. 6 is a side elevation of the blade.

The blade is provided with a cutting edge 26 on the opposite edge from the extension 22. The plate or support 15 is so mounted between the side members 10 of the body that its free end may be swung outwardly from between these side members to substantially the position shown in Fig. 4 to expose the notch 18, and when in this position the blade may be mounted in this plate by placing the extension 22 in this notch as above described. The blade and plate may then be swung about the pivot 17 into the position shown in full lines in Fig. 1, in which position the plate 15 is substantially entirely enclosed between the side members of the body as is also the upper portion of the blade including the extension 22. Therefore, in this position the side members 10 of the body prevent the blade disconnecting from the plate. In other words the side members of the body cooperate with the interlocking members of the blade and plate to retain the blade in the plate. In this position the forward inclined edge 27 of the blade engages the connecting wall 11 which forms a stop for the blade with its cutting edge 26 exposed for use.

When not in use the blade 16 and its supporting plate 15 may be swung about the pivot 17 to the dotted line position in Fig. 1. In this position the side members 10 of the body still cooperate with the interlocking means on the blade and plate to retain the blade in the plate, and at the same time the cutting edge is in the space between the side members where it is out of the way, and the knife can be carried without injury either to the cutting edge or the person carrying it. A fibre disc 28 is provided about one of the rivets 14 to form a stop for the cutting edge and prevent its being injured by coming in contact with the filling member 13. The members are so fitted that the blade and plate may be readily swung about the pivot 17, but with a sufficiently close arrangement that the friction of the side members on the plate and blade will hold them in different positions.

It will be apparent from the foregoing description that as practically the entire knife is made of sheet metal it gives a very thin construction, and furthermore, that it can be stamped from sheet metal with practically no forming operations. It will also be apparent that the operation of renewing and inserting the blades is a very simple one which may be easily and quickly performed, but when in cutting position will securely retain the blade in proper position.

Having thus set forth the nature of my invention, what I claim is:

1. In a knife, a body comprising sheet metal side members connected together in spaced relation, a plate pivoted between said members and of a thickness substantially the same as the space between said members, a blade of substantially the same thickness as the plate, and interlocking means carried by the plate and blade cooperating with the side members to secure the blade to the plate.

2. In a knife, a body comprising spaced side members, a plate mounted between said members and movable relative thereto, said plate being of a thickness substantially equal to the space between said members, a blade of substantially the same thickness as the plate, and interlocking means on the blade and plate cooperating with the side members to secure the blade to the plate.

3. In a knife, a body comprising spaced side members, a plate mounted between said members and movable relative thereto, said plate being of substantially the same thickness as the space between said members, a blade of substantially the same thickness as the plate, and interlocking means on the blade and plate adapted for engagement and disengagement by a relatively lateral movement of the plate and blade to mount the blade in the plate and remove it therefrom, said plate being movable to a position between said side members so that they serve to prevent said lateral movement and said plate being movable to a position outside the body to allow removal of the blade.

4. In a knife, a body comprising spaced side members, a plate mounted between said members and movable relative thereto, said plate being of substantially the same thickness as the space between said members, a blade of substantially the same thickness as the plate, interlocking means on the rear edge of the blade and the forward edge of the plate, said plate being movable to a position in the body where the side members act to prevent disengagement of said means, said plate being also movable to a position to allow disengagement of said means.

5. In a knife, a body comprising a sheet metal member folded upon itself to provide side members, means for securing the side members in spaced relation, a plate pivoted between said members and of substantially the same thickness as the space between the side members, a blade of substantially the same thickness as the plate, and interlocking means on the plate and blade to removably secure the blade to the plate, said plate being movable to a position between the side members where these members prevent disengagement of said means, said plate being also movable to a position to permit disengagement of said means.

6. In a knife, a body comprising spaced side members, a plate pivoted between said members, a blade, interlocking means on the rear edge of the blade and the forward edge of the plate, said plate being mounted to swing about its pivot to positions to expose the sharp edge of the blade for use and to enclose said edge in the body, the side members being arranged to cooperate with the interlocking means in both these positions to retain the blade in the plate.

7. In a knife, a body comprising spaced side members, a plate pivoted between said members, a blade, interlocking means on the rear edge of the blade and the front edge of plate, said plate being mounted to swing about its pivot to positions to expose the sharp edge of the blade for use and to enclose said edge in the body, the side members being arranged to cooperate with the interlocking means in both these positions to retain the blade in the plate, and said plate being movable to an intermediate position to permit removal of the blade from the plate.

8. In a furrier's knife, a body formed of sheet metal embodying side walls, spacing devices between the side walls, means for securing the side walls together and passing thru said spacing devices, a blade holding plate pivotally supported between the side walls and a cutting blade having interlocking connection with the plate at the rear edge only of said blade, the connection between the plate and blade being located at the forward end of the plate whereby pivotal movement of the plate will dispose the interlocking connection outwardly of the handle side walls for disengagement thereof.

9. In a furrier's knife, a body formed of sheet metal embodying side walls, spacing devices between the side walls, means for securing the side walls together and passing thru said spacing devices, a blade holding plate pivotally supported between the side walls and a cutting blade having interlocking connection with the plate, the interlocking engagement including the provision of recesses in the rear edge of the cutting blade and lug projections carried by the forward end of the plate interlockingly received in said recesses.

10. In a furrier's knife, a body formed of sheet metal embodying side walls, spacing devices between the side walls, means for securing the side walls together and passing thru said spacing devices, a blade holding plate pivotally supported between the side walls and a cutting blade having interlocking connection with the plate, the connection between the plate and blade being located at the forward end of the plate whereby pivotal movement of the plate will dispose the interlocking connection outwardly of the handle side walls for disengagement thereof, the interlocking engagement including the provision of recesses in the rear edge of the cutting blade and lug projections carried by the forward end of the plate interlockingly received in said recesses.

In testimony whereof I affix my signature.

LADISLAUS FEKETE.